(12) United States Patent
Yamamoto

(10) Patent No.: US 7,043,135 B2
(45) Date of Patent: May 9, 2006

(54) MAGNETIC RECORDING AND REPRODUCING APPARATUS

(75) Inventor: Yukihiro Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1151 days.

(21) Appl. No.: 09/794,392

(22) Filed: Feb. 28, 2001

(65) Prior Publication Data

US 2003/0190136 A1    Oct. 9, 2003

(30) Foreign Application Priority Data

Mar. 9, 2000   (JP) .............................. 2000-064900

(51) Int. Cl.
*H04N 7/00* (2006.01)
*H04N 5/91* (2006.01)

(52) U.S. Cl. ........................................ 386/46; 386/123

(58) Field of Classification Search ................ 386/131, 386/123, 124, 46, 120, 117, 107, 52, 40, 38, 386/37, 4

See application file for complete search history.

(56) References Cited

U.S. PATENT DOCUMENTS

2003/0067558 A1* 4/2003 Shintani et al. ............. 348/569
2003/0135852 A1* 7/2003 Kamemoto ................... 725/32
2004/0150747 A1* 8/2004 Sita ............................. 348/558

FOREIGN PATENT DOCUMENTS

| EP | 0 838 948 A1 | 4/1998 |
| EP | 0838498 A1 * | 4/1998 |
| JP | 11-168679 | 6/1999 |
| WO | WO 00/72587 A1 | 11/2000 |

* cited by examiner

*Primary Examiner*—Bob Chevalier
(74) *Attorney, Agent, or Firm*—McDermott Will & Emery LLP

(57) ABSTRACT

A magnetic recording and reproducing apparatus changes a display location of an on-screen-display (OSD) for setting a condition responsive to a ratio of lateral length vs. vertical length of a screen of a display device such as TV and an aspect ratio of a video. In this apparatus, an OSD controller generates an OSD signal. An OSD signal outputting section allows a video output signal to include this OSD signal. A selector selects an aspect ratio of a display area of the video output signal. When the selector selects a given aspect ratio, the controller places the OSD signal at a location in the video output signal responsive to the aspect ratio. The OSD is thus normally displayed without being cut off from the screen.

8 Claims, 4 Drawing Sheets

MAGNETIC RECORDING AND REPRODUCING APPARATUS

FIELD OF THE INVENTION

The present invention relates to a magnetic recording and reproducing apparatus which can change a display location of on-screen-display (OSD) on a display device responsive to an aspect ratio of a video.

BACKGROUND OF THE INVENTION

Recently, High-Definition (HD) broadcasting and Extended Definition (ED) broadcasting—both having 16:9 aspect ratio—have been practiced, and digital broadcasting method has progressed in television broadcasting. These situations increase a number of programs having 16:9 aspect ratio in conventional programs having 4:3 aspect ratio. The aspect ratio is a ratio of horizontal length vs. vertical length of a display area displayed on a screen of the display device.

A content recorded by HD method in the format of 16:9 aspect ratio may be broadcasted in the 4:3 aspect ratio format, or often used as a recorded video source.

Responsive to this market trend, a wide-display-device, having a screen of 16:9 aspect ratio, prevails in the market for receiving these new types of broadcasting.

This wide-display-device has various displaying functions as follows:

1. Displaying a program in the 16:9 aspect ratio format, included in a video source in the 4:3 aspect ratio format, on the entire screen of the wide-display-device;
2. Displaying a video source in the 4:3 aspect ratio format, and a vertical length of the video source being displayed in full vertical length of the screen with keeping this ratio. (so called a normal mode, or referred to as a side panel display, i.e., black vertical belts exist on both sides of effective display area.)
3. Converting a video in the 4:3 aspect ratio format to a video in the 16:9 aspect ratio format and displaying the converted video on the entire screen.

Under this circumstance, a magnetic recording and reproducing apparatus, such as a video tape recorder (VTR), outputs a signal which instructs to display an on-screen-display (OSD). A conventional magnetic recording and reproducing apparatus in this circumstance is described hereinafter.

FIG. 3 is a block diagram showing a structure of an OSD of the conventional apparatus. FIG. 4 illustrates OSD displayed by the conventional magnetic recording and reproducing apparatus.

In FIG. 3, when OSD operating section 31 is operated, an OSD signal is output on a display device such as a television receiver (TV), and the OSD is displayed on the screen of the display device. Various modes and conditions of the magnetic recording and reproducing apparatus are displayed by using this OSD. OSD operating section 31 is provided in a body of a VTR or a remote controlling unit.

OSD controller 32 generates OSD data, such as a binary video signal, for displaying an OSD through the operation of OSD operating section 31.

OSD signal outputting section 33 inserts the data signal generated by OSD controller 32 into an output video signal. Thus the OSD data is displayed on the screen of the display device such as a TV.

An operation of the conventional magnetic recording and reproducing apparatus as structured above is described hereinafter taking an example of a VTR.

First, an operator transmits his/her operating command to OSD controller 32 by operating OSD operating section 31, disposed to, e.g., a remote controlling unit, in order to confirm the status of the VTR or other conditions. OSD controller 32 generates OSD data responsive to the operation on section 31, and outputs the data to OSD signal outputting section 33. Thus OSD signal outputting section 33 allows the OSD data to be included in an output signal from the VTR. This signal is supplied to the display device such as a TV. The OSD data is finally displayed on the screen of the display device.

Next, the performance of OSD function in the VTR is described, together with a relation to the display devices including a wide display, with reference to FIG. 4.

FIG. 4 shows a wide display, i.e., screen 40 having an aspect ration of 16:9, on which OSD data 42 of the conventional VTR discussed above is displayed.

FIG. 4A illustrates a status where a video source is displayed on video display area 41 having a 4:3 aspect ratio. FIG. 4B illustrates a status where the same video source is displayed on entire video display area 43 having a 16:9 aspect ratio, i.e. a wide display.

On the upper and lower edges of screen 40, OSD data 42 is displayed. The OSD data indicates information of various conditions of the VTR and time information.

FIG. 4B shows that OSD data 42 goes over screen 40, and stick-out portion of the data over screen 40, which should not appear on screen 40, is displayed for the explanation purpose.

In this display, at first, OSD data 42 displayed on a TV screen by OSD signal outputting section 33 is fixed at its location. Next, for instance, when the wide display shows a video of 4:3 aspect ratio as shown in FIG. 4A, the OSD is displayed, and then the display is switched to 16:9 aspect ratio format as shown in FIG. 4B (function 3 of the wide display). This condition is considered hereinafter.

At this time, in order to display the video on the entire screen, the video may be expanded in a vertical direction when the video is converted into 16:9 format.

In such a situation, video display area 41 is expanded and OSD display data 42 is shifted in the vertical direction at the same time. Therefore, parts of or whole of OSD display data 42 may go over the screen and is not displayed.

Further, when a video of 4:3 aspect ratio is displayed, OSD is practiced, then the function 1 of the wide display is carried out. At this time, parts of or whole of OSD display data 42 may not be displayed on the screen.

As such, since the wide display have functions to display a video of different aspect ratios in a various formats, it is difficult to specify a displaying location of OSD data generated by a video signal source of a magnetic recording and reproducing apparatus.

SUMMARY OF THE INVENTION

The present invention addresses the problem discussed above and aims to provide a magnetic recording and reproducing apparatus which can set a location of displaying an OSD responsive to a ratio of horizontal length vs. vertical length of the TV screen and an aspect ratio of a video image.

The magnetic recording and reproducing apparatus of the present invention outputs a video output signal including an OSD signal, the apparatus comprises the following elements:

(a) an OSD controller for generating the OSD signal;
(b) an OSD signal output section for allowing the OSD signal to be included in the video output signal; and (c) a selector for selecting an aspect ratio of a display area of the video output signal.

Further, when the selector selects a given aspect ratio, the OSD controller places the OSD signal at a location of the video output signal responsive to the selected aspect ratio.

This structure allows the location of the OSD to be switched responsive to the aspect ratio of a display device including a TV and the aspect ratio of a video. Therefore, the OSD does not go over the screen of the display device, but is normally displayed.

DESCRIPTION OF THE PREFERRED EMBODIMENT

An exemplary embodiment of the present invention is demonstrated hereinafter with reference to the accompanying drawings.

Figure 1:
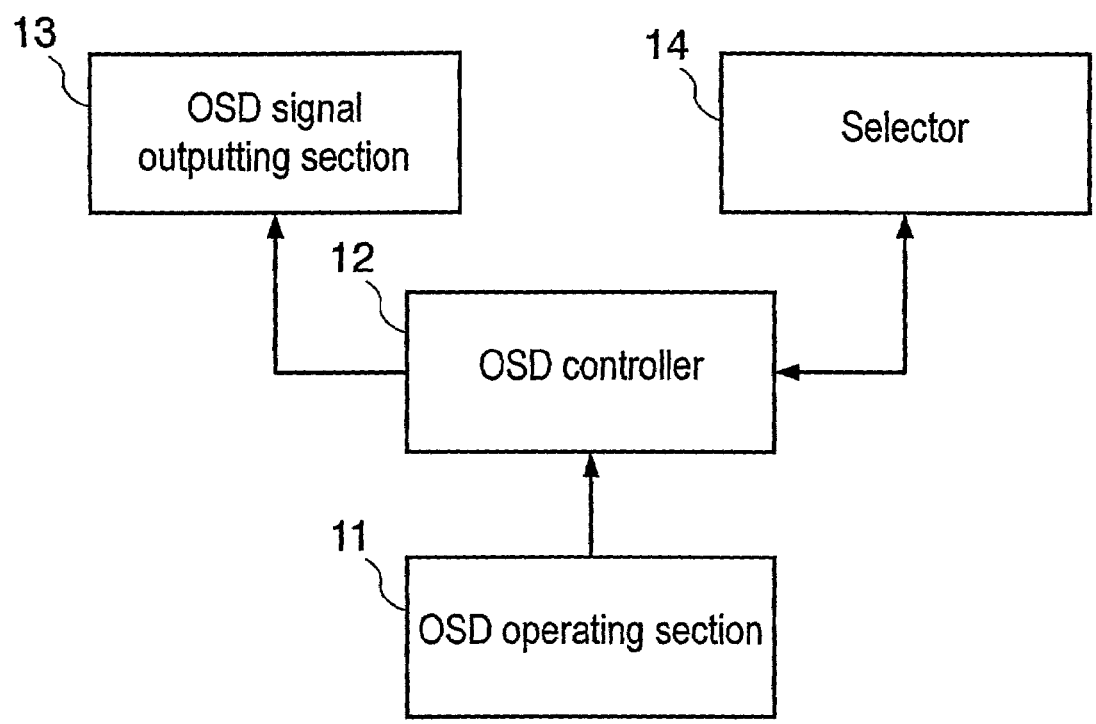
FIG. 1 is a block diagram showing a structure of an OSD display of a magnetic recording and reproducing apparatus in accordance with an exemplary embodiment of the present invention.
Figure 2A:
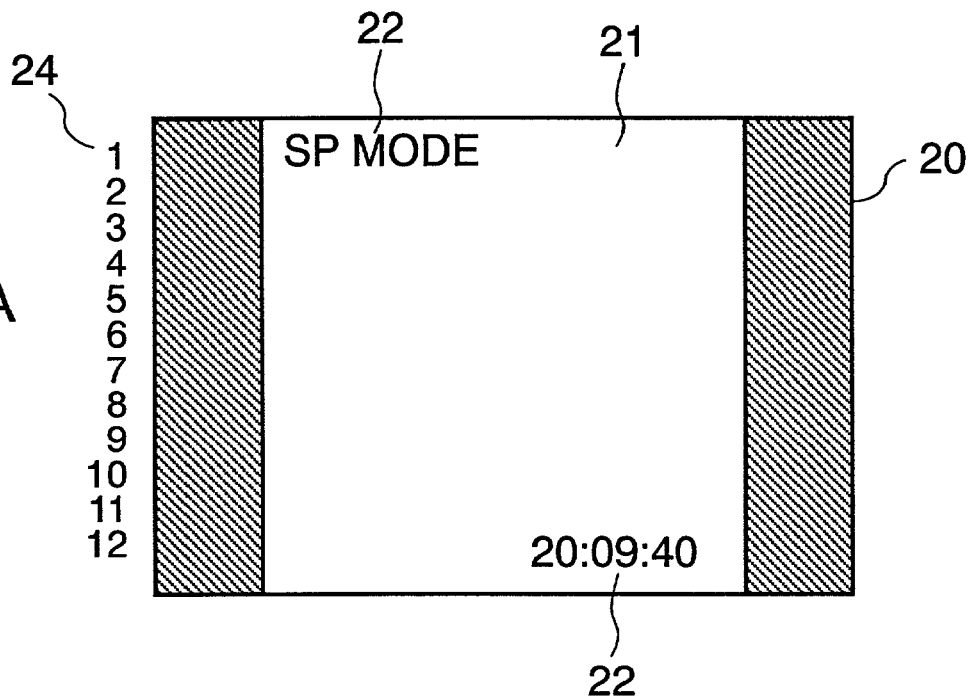
FIG. 2A and FIG. 2B show an OSD in accordance with the exemplary embodiment of the present invention.
Figure 2B:
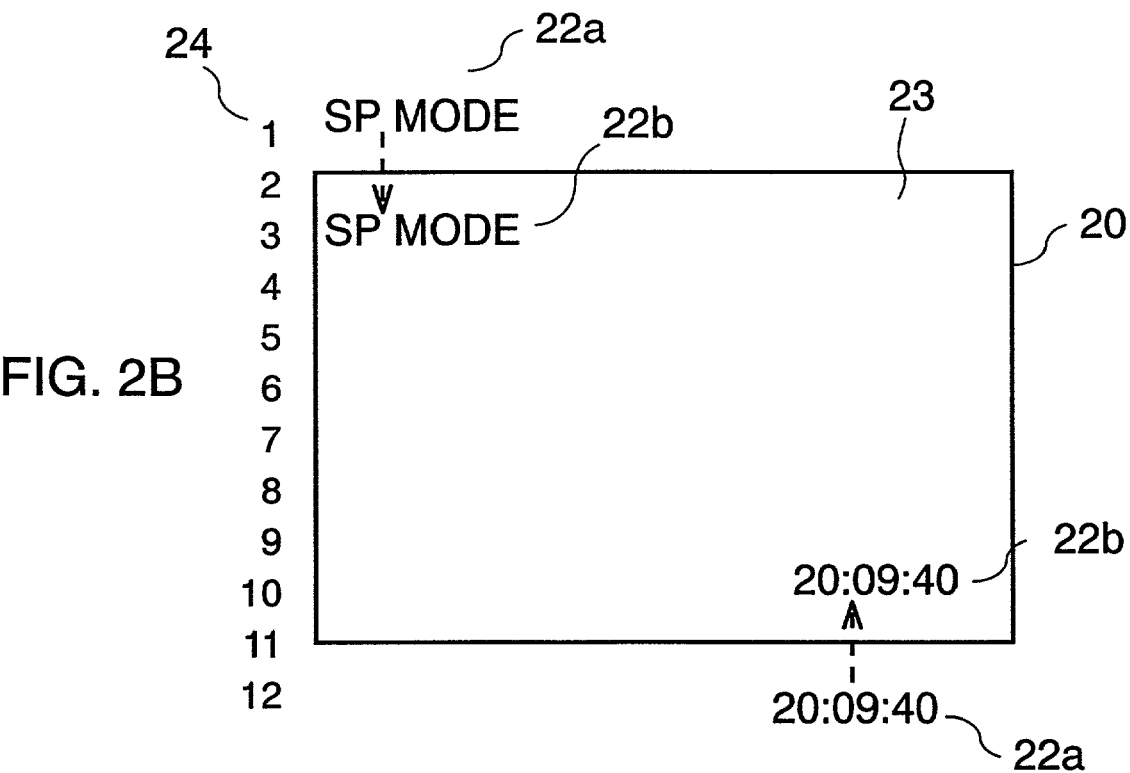
Figure 3:
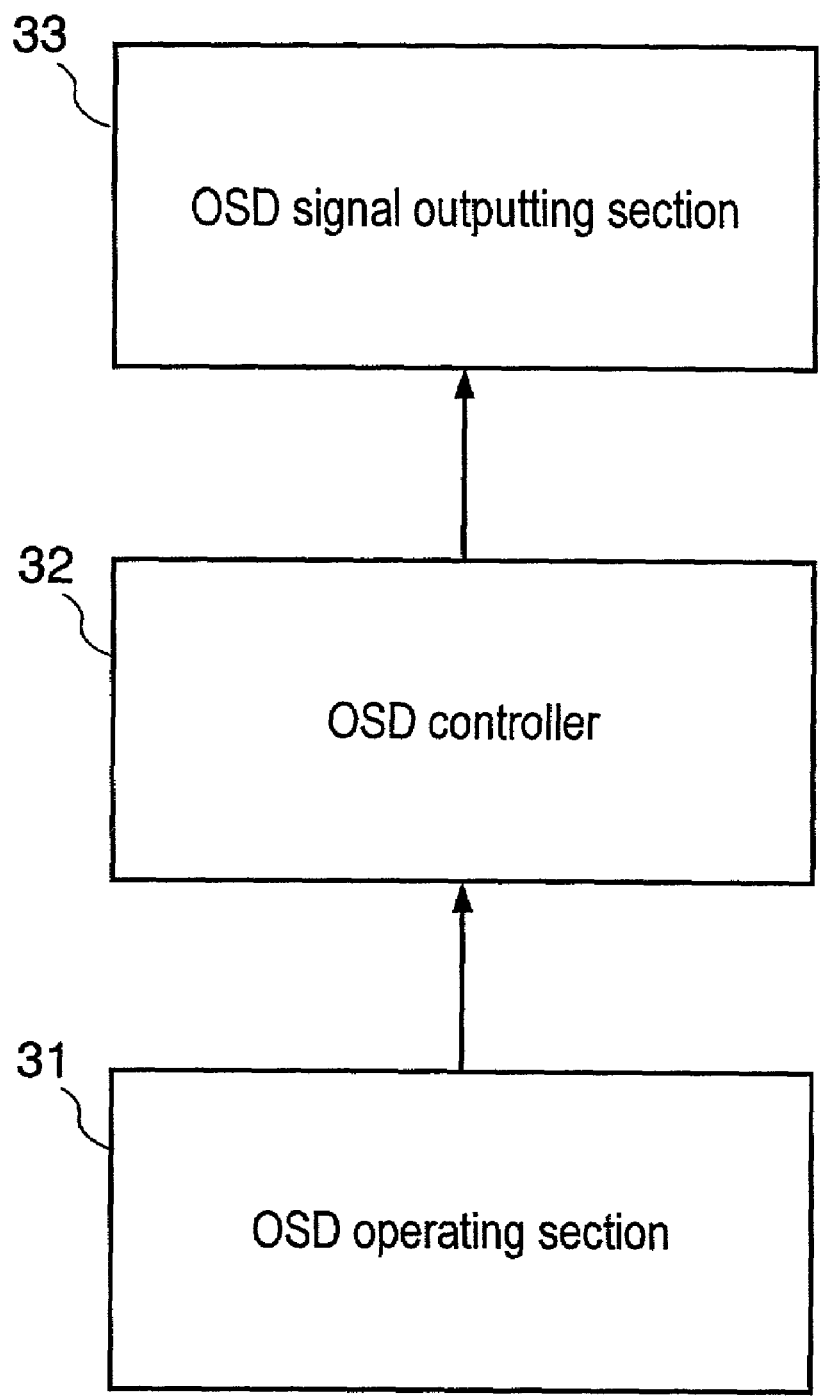
FIG. 3 is a block diagram showing a structure of an OSD display of a conventional magnetic recording and reproducing apparatus.
Figure 4A:
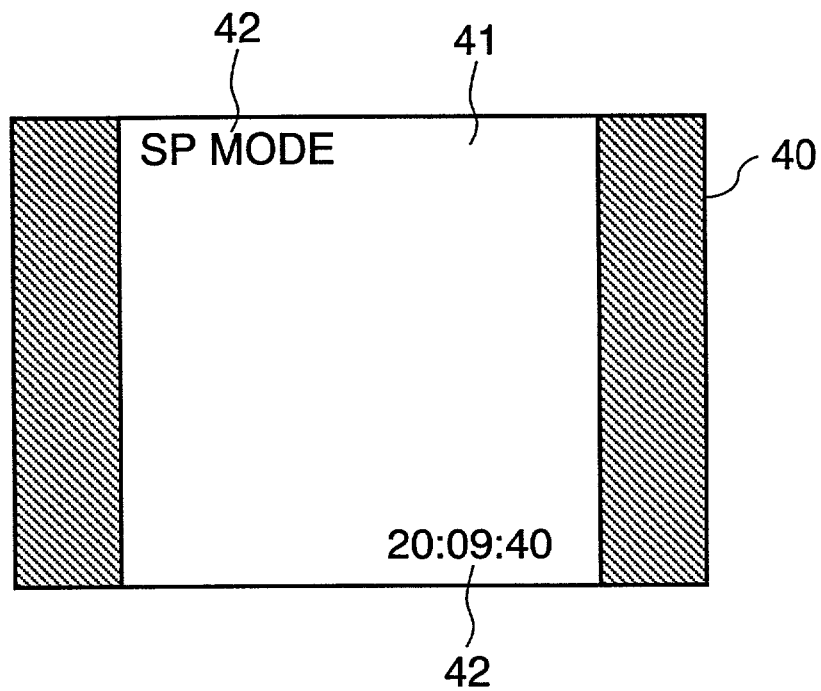
FIG. 4A and FIG. 4B show an OSD in the conventional magnetic recording and reproducing apparatus.
Figure 4B:
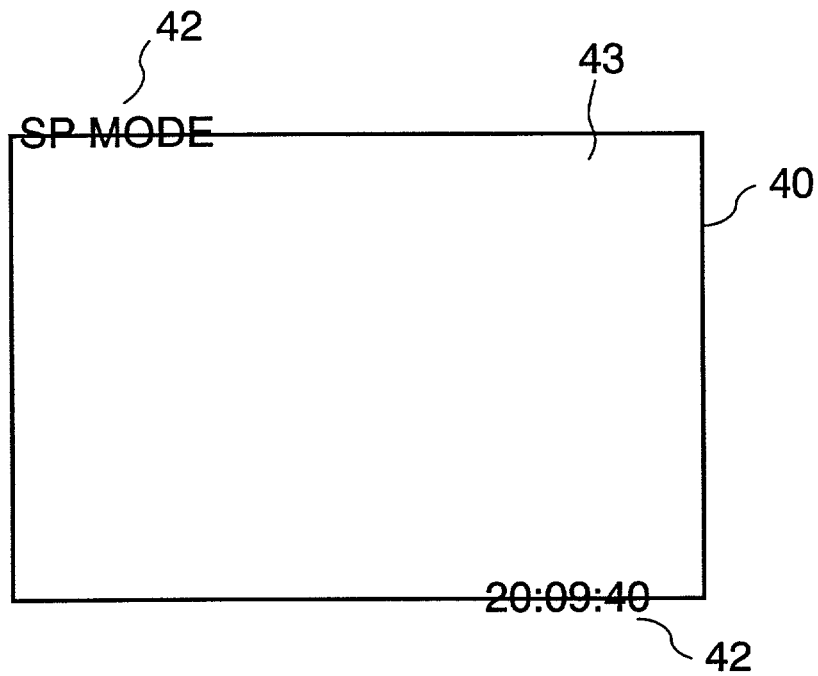

FIG. 1 is a block diagram showing a structure of a magnetic recording and reproducing apparatus in accordance with the exemplary embodiment of the present invention. FIG. 2 shows schematically a display status in accordance with the same exemplary embodiment. FIG. 2A shows that a video source in a 4:3 aspect ratio displayed on a wide display. FIG. 2B shows that the video source in a 16:9 aspect ration displayed on the wide display.

In FIG. 1, OSD operating section 11 is disposed in a VTR or a remote controlling unit for a user to confirm a status of the VTR as well as generate OSD data in the VTR.

OSD selector 14 has a function of selecting an aspect ratio for switching a display of the OSD responsive to an aspect ratio of a display area of a video source displayed on a display device such as a TV. For instance one of the aspect ratios of 16:9 and 4:3 is selected. Further, selector 14 outputs a signal, indicating a display location of the OSD responsive to the selected aspect ratio, to OSD controller 12.

The selection discussed above is carried out by one of the following two ways:

(a) A user looks at the screen of the display device, and switches the screen, through operating section 11, responsive to the aspect ratio of the display area of the video.

(b) A video display area of the video of an output video signal is detected by, e.g., selector 14. For instance, (b-1) whether or not effective information signals exist on average for a given period from the beginning of a vertical scanning period and a given period before the end of the vertical scanning period, and (b-2) whether or not effective information signals exist in the middle of the given periods. If both (b-1) and (b-2) are detected, the signal contains a video of which aspect ratio is longer at a horizontal length than that of the 4:3 aspect ratio.

At this time, OSD controller 12 changes an interpolation location of OSD data in the video output signal responsive to the output signal from selector 14 so that the OSD data can be displayed within the display area of the video.

(c) In the case of a landscape video having, e.g., an aspect ratio of 16:9 (so called a letter box type video), the video signal sometimes includes an identification signal of a letter box signal. When the video signal includes the identification signal, selector 14, for instance, detects this identification signal. Then OSD controller 12 changes a location of OSD data in the video output signal responsive to the detection result so that the OSD data can be displayed within the display area of the video.

In the cases of (b) and (c) discussed above, regardless of switching an aspect ratio of the display device, the OSD data is displayed in a display area of the video signal. Thus the user can look at the OSD data without any drop-outs.

When "Display OSD." is input through OSD operating section 11, OSD controller 12 generates OSD data comprising binary video. This OSD data is not necessarily a binary, but may be a multi-level gradation data.

Selector 14 determines whether the aspect ratio of an OSD picture selected is 4:3 or 16:9.

OSD signal output section 13 inserts the OSD data generated by controller 12 into the video output signal, which is output to the display device such as a TV. The OSD data is thus displayed on the display device.

The OSD data displayed indicates, e.g., a condition or various signs of the VTR.

The display device, as previously mentioned, can display a plurality of videos having different aspect ratios. In this embodiment, selector 14 can select the aspect ratios of 16:9 and 4:3; however, if the display device can deal with other aspect ratios, the selector can be adjusted accordingly.

In FIG. 2, screen 20 of the display device can display a video of 16:9 aspect ratio. Video display area 21 shows the area when the video of 4:3 aspect ratio is displayed. Video display area 23 shows the area when the video of 16:9 aspect ratio is displayed. OSD data 22 is displayed on screen 20 to indicate a condition and a counter number of the VTR. Line number 24 is a reference of a display location of OSD data 22. In this embodiment, a 12th line is a bottom line; however, the line number may take any number.

An operation of the magnetic recording and reproducing apparatus structured above is demonstrated hereinafter.

In FIG. 1, a user operates OSD operating section 11 disposed in a remote controlling unit or the like in order to confirm a condition of the VTR. Operating section 11 transmits a command the user input to OSD controller 12, which generates OSD data responsive to the command. The OSD data then supplied to OSD signal output section 13, which inserts an OSD signal into a video output signal. The video output signal including the OSD signal is supplied to a display device such as a TV. The OSD data is thus displayed on a screen of the display device.

When the display device displays a video supplied from the VTR, such as a video recorded in the tape, or an on-air video of television broadcasting through a tuner built in the VTR, the OSD can be super-imposed on this video. The OSD may be displayed on a given background such as blue-back without displaying any video.

In the condition of displaying the OSD, when the display device, e.g., a TV, changes its 4:3 aspect ratio (normal mode) to 16:9 (wide mode), parts (in this case, upper and lower sections) of the OSD data is cut off from the screen and could not be seen.

Then the user changes a setting of selector 14 from 4:3 to 16:9 through OSD operating section 11, thereby controller 12 changes a location of the OSD data in the video output signal so that the OSD data can be placed within a screen of 16:9 aspect ratio.

Display control is described hereinafter with reference to FIG. 2. When a video is displayed in 4:3 aspect ratio, OSD data 22 in video display area 21 is displayed within screen 20 as shown in FIG. 2A. At this time, the OSD data is interpolated into a location of the video output signal corresponding to the location thereof in the screen.

At this time, the OSD data displayed at an upper end and a lower end of the screen are located on the first line and the 12th line respectively. After this, the display device changes a video aspect ratio to 16:9 as shown in FIG. 2B, then the video displayed in display area 21 is vertically expanded and the OSD is also moved in a vertical direction. OSD data 22 located on the first line and the 12th line go over the screen 20.

Selector 14 shown in FIG. 1 is activated, so that OSD controller 12 moves the location of the OSD data in the video output signal. As a result, OSD data 22a originally located on the first line is moved to the third line as data 22b, and data 22a originally located on the 12th line is moved to the 10th line as data 22b. Therefore, whole data 22b can be normally displayed in screen 20.

As discussed above, when a video display setting is changed from the aspect ratio of 16:9 to that of 4:3, selector 14 selects the aspect ratio of 4:3. OSD controller 12 then moves the OSD data from the third and tenth lines to the first and 12th lines responsive to the selection by selector 14. The OSD data is thus displayed normally within the display area.

A landscape video such as the video of 16:9 aspect ratio is detected, i.e., the fact is detected that the horizontal length of the landscape video is rather longer comparing with the video of normal aspect ratio. Then the operation discussed above is carried out, thereby moving the OSD data into the video display area. This performance corresponds to the items (b) and (c) discussed previously.

The exemplary embodiment discussed above proves that a magnetic recording and reproducing apparatus such as a VTR comprises the following elements:

(a) OSD operating section 11 for operating an OSD such as displaying a condition of the VTR;

(b) OSD controller 12 for displaying, erasing or moving the OSD by operating the OSD display;

(c) OSD signal outputting section 13 for interpolating an OSD signal into a video output signal in order to display the OSD in a screen of a display device;

(d) aspect selector 14 for changing a display location of the OSD responding to an aspect ratio of the display device or a video source, e.g., 4:3 or 16:9.

The structure discussed above allows the following two items:

(1) The display device can set a location of the OSD responding to the screen of the display device and the video because OSD selector 14 can switch a setting of OSD's display location, thereby changing the aspect ratio of the display area of the display device.

(2) Regardless of the aspect ratio setting in the display device, the display location of the OSD can be set so that the OSD is displayed within an effective display area of the video source.

As concluded above, the present invention proves that a display location of an OSD can be switched responsive to an aspect ratio of a screen of a display device such as a TV or an aspect ratio of a video source. Therefore, the OSD can be normally displayed without going over the TV screen.

What is claimed is:

1. A magnetic recording and reproducing apparatus for outputting a video output signal including an on screen display (OSD) signal, said apparatus comprising:
   (a) an OSD controller for generating the OSD signal;
   (b) an OSD signal outputting section which allows the OSD signal to be included in the video output signal; and
   (c) a selector for selecting an aspect ratio of a display area of the video output signal,
   wherein when said selector selects a given aspect ratio, the OSD signal is placed at a location in the video output signal responsive to the given aspect ratio, and
   wherein the location is specified by dividing the display area of the video output signal in a vertical direction into lines of integer numbers and designating one of the integer numbers.

2. The magnetic recording and reproducing apparatus as defined in claim 1, wherein the location is within the display area of the video output signal.

3. The magnetic recording and reproducing apparatus as defined in claim 1 further comprising:
   an OSD operating section,
   wherein said selector selects the given aspect ratio responsive to an input signal from said OSD operating section.

4. The magnetic recording and reproducing apparatus as defined in claim 3, wherein a user operates said OSD operating section to select the given aspect ratio responsive to an aspect ratio of the display area of the video output signal.

5. The magnetic recording and reproducing apparatus as defined in claim 1, wherein said selector selects the given aspect ratio responsive to the video display area of the video output signal.

6. The magnetic recording and reproducing apparatus as defined in claim 1, wherein when the video output signal includes an identification signal which indicates an aspect ratio of a video, said selector selects the given aspect ratio corresponding to the identification signal.

7. The magnetic recording and reproducing apparatus as defined in claim 1, wherein the OSD signal is a binary video signal.

8. A magnetic recording and reproducing apparatus for outputting a video output signal including an on screen display (OSD) signal said apparatus comprising:
   (a) an OSD controller for generating the OSD signal;
   (b) an OSD signal outputting section which allows the OSD signal to be included in the video output signal; and
   (c) a selector for selecting an aspect ratio of a display area of the video output signal,
   wherein when said selector selects a given aspect ratio, the OSD signal is placed at a location in the video output signal responsive to the given aspect ratio, and
   wherein when the video output signal includes an identification signal which indicates an aspect ratio of a video, said selector selects the given aspect ratio corresponding to the identification signal.

* * * * *